United States Patent

[11] 3,592,348

[72] Inventor Wayne G. Atwater
 Willoughby, Ohio
[21] Appl. No. 875,474
[22] Filed Nov. 10, 1969
[45] Patented July 13, 1971
[73] Assignee The Triax Company
 Cleveland, Ohio

[54] LOAD CARRIER-LOAD SUPPORT MECHANISM IN AUTOMATIC WAREHOUSING SYSTEM
15 Claims, 13 Drawing Figs.

[52] U.S. Cl. ................................................. 214/16.4 A,
 214/730, 214/89
[51] Int. Cl. ....................................................... B65g 1/06
[50] Field of Search ........................................... 214/16.4,
 16.42, 16.1 B, 730

[56] References Cited
UNITED STATES PATENTS

| | | | |
|---|---|---|---|
| 3,049,247 | 8/1962 | Lemelson | 214/16.4 A |
| 3,405,817 | 10/1968 | Alimanestianu | 214/16.1 (B) |
| 3,445,007 | 5/1969 | Burch | 214/16.4 B |
| 3,499,554 | 3/1970 | Davis et al. | 214/16.4 B |
| 3,507,406 | 4/1970 | Zollinger | 214/16.4 A |
| 3,531,705 | 9/1970 | Rosin et al. | 214/16.4 A |

Primary Examiner—Gerald M. Forlenza
Assistant Examiner—Raymond B. Johnson
Attorney—Baldwin, Egan, Walling & Fetzer ABSTRACT: An automatic warehousing system including a load carrier movable horizontally and vertically in a travel zone for depositing loads into and removing loads from a storage rack, with other load support structure coacting with the travel zone for supporting one or more loads in position to be handled by the load carrier for transmittal to the storage rack. The load carrier includes a cantilever section on which is mounted an extensible load-handling device or extractor. In one embodiment, the other load support structure comprises opposing pickup and discharge station structures having means thereon for supporting a load between the two stations, with the cantilever section and load-handling extractor being adapted to be received in nested relation between the two stations for handling loads supported between said two stations as well as loads supported solely on one station. In another embodiment the other load support structure comprises a conveyor mechanism having a cutout section in which the cantilever section and load-handling extractor are adapted to nest, with a load being adapted to be positioned above said cutout section, for handling by the load carrier upon raising of the extractor thereof.

PATENTED JUL 13 1971 3,592,348

INVENTOR
WAYNE G. ATWATER
BY
Baldwin, Egan, Walling & Fetzer
ATTORNEYS

INVENTOR
WAYNE G. ATWATER
BY
Baldwin, Egan, Walling & Fetzer
ATTORNEYS

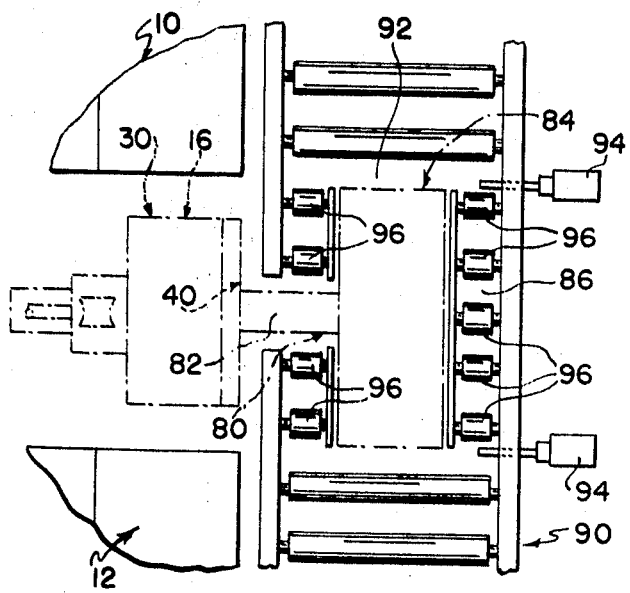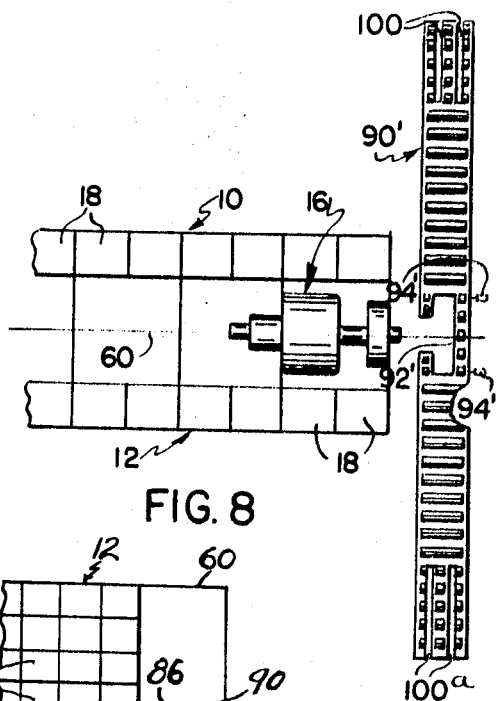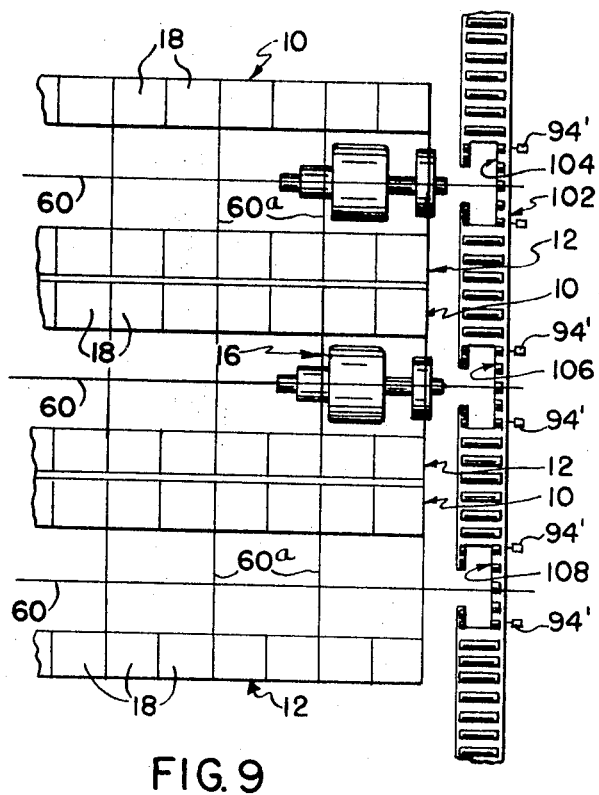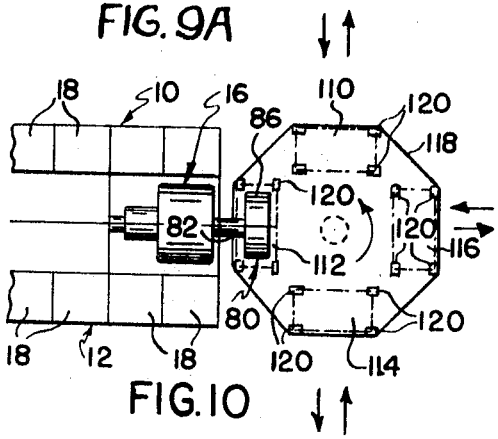

3,592,348

LOAD CARRIER-LOAD SUPPORT MECHANISM IN AUTOMATIC WAREHOUSING SYSTEM

This invention relates in general to automatic warehousing systems and more particularly to novel load carrier—load support combinations for warehousing systems.

It is well known in the automatic warehousing art to provide a storage frame having a plurality of storage openings accessible at a vertical load-receiving face of the storage frame, and having a powered load carrier operable for delivering loads to and retrieving loads from the storage openings in the storage frame. The storage frame is commonly provided in opposed parallel extending sections with each section having openings facing an aisle or travel zone disposed between the storage sections. The load carrier conventionally comprises a horizontally movable conveyor portion or frame which travels along the aforementioned travel zone and provides a vertical trackway for an elevator capable of lifting loads to and from different levels. The elevator in turn, carries a laterally extensible extractor or load-transferring means for inserting loads into the storage openings and retrieving loads therefrom. Moving the loads to a position adjacent the load carrier may be accomplished by means of conveyor mechanism extending between a source of loads for movement into the system, and what is known as pickup and discharge station structure generally located adjacent the entry end of the aforementioned travel zone. The conveyor mechanism is adapted to move loads to the pickup and discharge station or stations from whence the load carrier is adapted to move the loads into the storage frame, or from the storage frame back onto the pickup and discharge station or stations, from which the loads are moved on the conveyor system away from the storage area. These input-output conveyor systems and associated pickup and discharge stations are sometimes quite complex and materially increase the costs of installing an automatic warehousing system.

SUMMARY OF THE INVENTION

The present invention provides an automatic warehousing system which includes a novel arrangement of load carrier mechanism having a cantilever mounted extractor portion which is adapted to nest in an opening in a pickup and discharge station structure or in an input-output conveyor having a cutout portion serving as a pickup and discharge station, to directly remove a load from the pickup and discharge station structure or from the conveyor, or to place a load on the pickup and discharge station structure or the conveyor. Hereafter, the term "pickup and discharge" will be abbreviated P and D. The present invention provides a more expeditious structure and manner for handling loads moving into and out of a warehousing system.

Accordingly, an object of the invention is to provide a novel warehousing system.

Another object of the invention is to provide a novel automatic warehousing system wherein an automatic load carrier having a cantilever mounted extractor is adapted to coact in nested relation during the handling of a load by the load carrier, with a P and D station structure comprising opposed P and D stations each adapted to support a load thereon and having means extending therebetween for supporting a third load in bridging relation between the opposed stations.

A further object of the invention is to provide a novel automatic warehousing system which includes an input-output conveyor mechanism for moving loads up to the load carrier mechanism of the system, and wherein the conveyor portion includes a cutout section in which a portion of the load carrier mechanism is adapted to nest during the handling of loads to either remove loads from or place loads on the conveyor system.

A still further object of the invention is to provide a novel automatic warehousing system wherein the storage structure is adapted to be serviced by a conveying means wherein the loads presented to the load carrier for handling are adapted to be supported on fork-type pickup and discharge stations which provide three positions for accumulating or supporting loads instead of the usual two positions.

A still further object of the invention is to provide a novel warehousing system wherein a conveyor is utilized as a staging area for accumulating loads to be handled in and loads brought out by the load carrier.

A still further object of the invention is to provide a novel automatic warehousing system which includes a rotatable pickup and discharge station assembly which is adapted to rotate into predetermined position to present a load for handling by the load carrier mechanism.

Another object of the invention is to provide a novel load carrier mechanism for an automatic warehousing system wherein the load carrier comprises a horizontally movable conveyor portion, a vertically movable elevator portion guided along the conveyor portion and a laterally extendible extractor portion, and wherein the elevator portion includes a cantilever section supporting the extractor portion in outwardly spaced relation to the remainder of the elevator portion.

Other objects and advantages of the invention will be apparent from the following description taken in conjunction with the accompanying drawings wherein:

BRIEF DESCRIPTION OF THE DRAWINGS

FIG. 7 is an enlarged, fragmentary, top plan view of the recessed portion of the conveyor of FIG. 6 showing in dot-dash lines the extractor mechanism of the load carrier received in nested relation in such recessed portion of the conveyor;

FIG. 8 is a diagrammatic top plan view of a single-aisle warehousing system utilizing a conveyor with an intermediate recess or cutout portion adapted to receive in nested relation the extractor mechanism of the load carrier, and wherein the conveyor mechanism has notched ends whereby it can be expeditiously utilized to accumulate loads to be handled in and out by conventional manually operated forklift trucks operating at the ends of the conveyor;

FIG. 9 represents a warehousing system embodying the plurality of travel zones with storage sections disposed along the travel zones and wherein the coacting input-output conveyor has a plurality of intermediate cutout sections, each of which is adapted to service the respective storage aisle;

FIG. 9A is a diagrammatic elevational view of a warehousing system embodying vertically spaced input-output conveyors, each of which has a cutout portion adapted to receive the extractor mechanism of the load carrier therein, thereby providing vertically arranged pickup and discharge locations on the vertically spaced conveyor mechanism;

FIG. 10 is a top plan, diagrammatic illustration of a warehousing system utilizing a rotating plural station pickup and discharge structure which has load support stations thereon adapted to receive in nested relation the extractor mechanism of the associated load carrier, and wherein the plurality of pickup and discharge station locations on the rotatable structure can be serviced by load input-load removal means, such as for instance, lift trucks, while the load carrier mechanism is handling the load at the confronting P and D station location;

DESCRIPTION OF THE PREFERRED EMBODIMENTS

Figure 1:
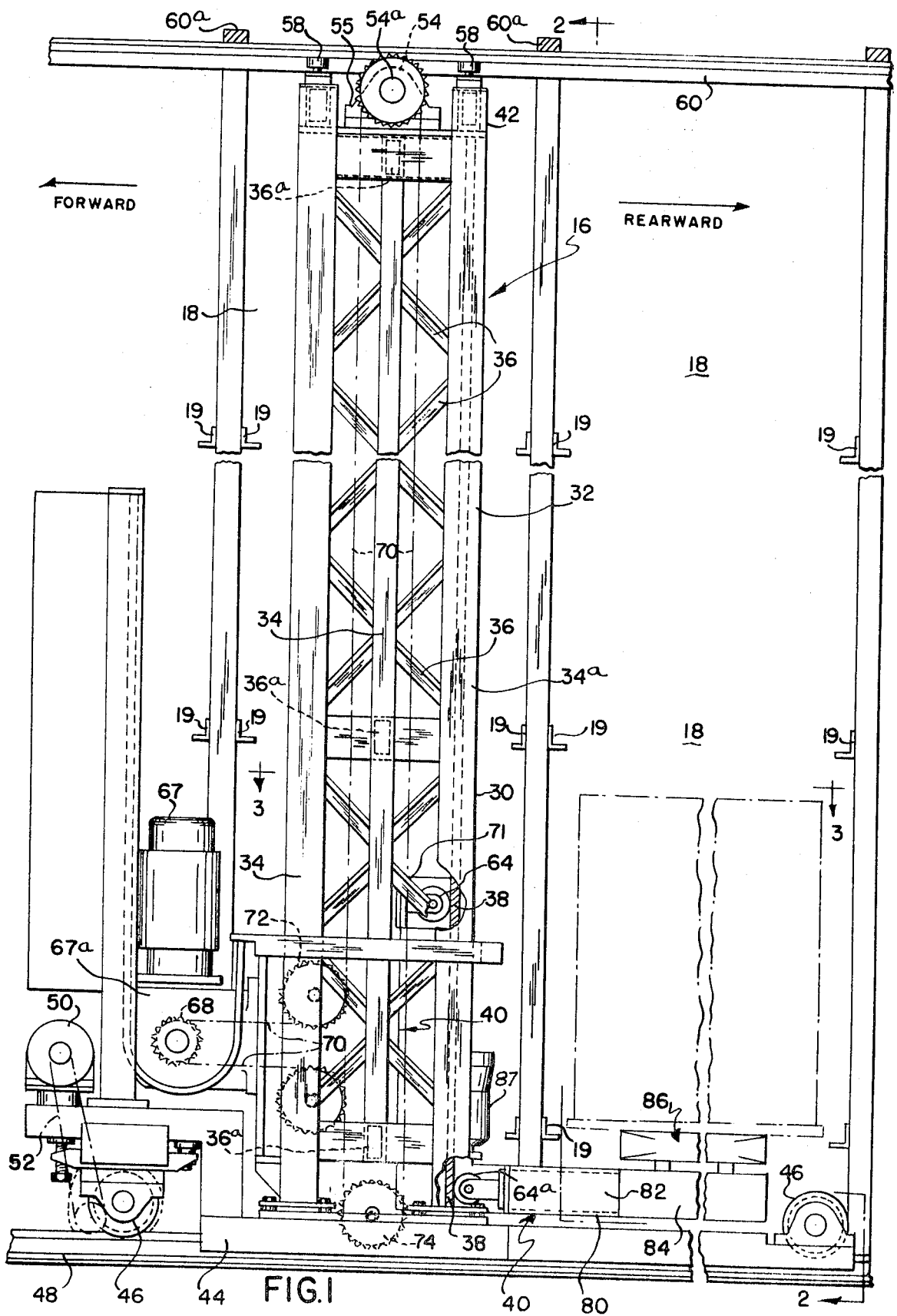
FIG. 1 is a broken, partially sectioned side elevational view of a load carrier mechanism constructed in accordance with the invention.
Figure 2:
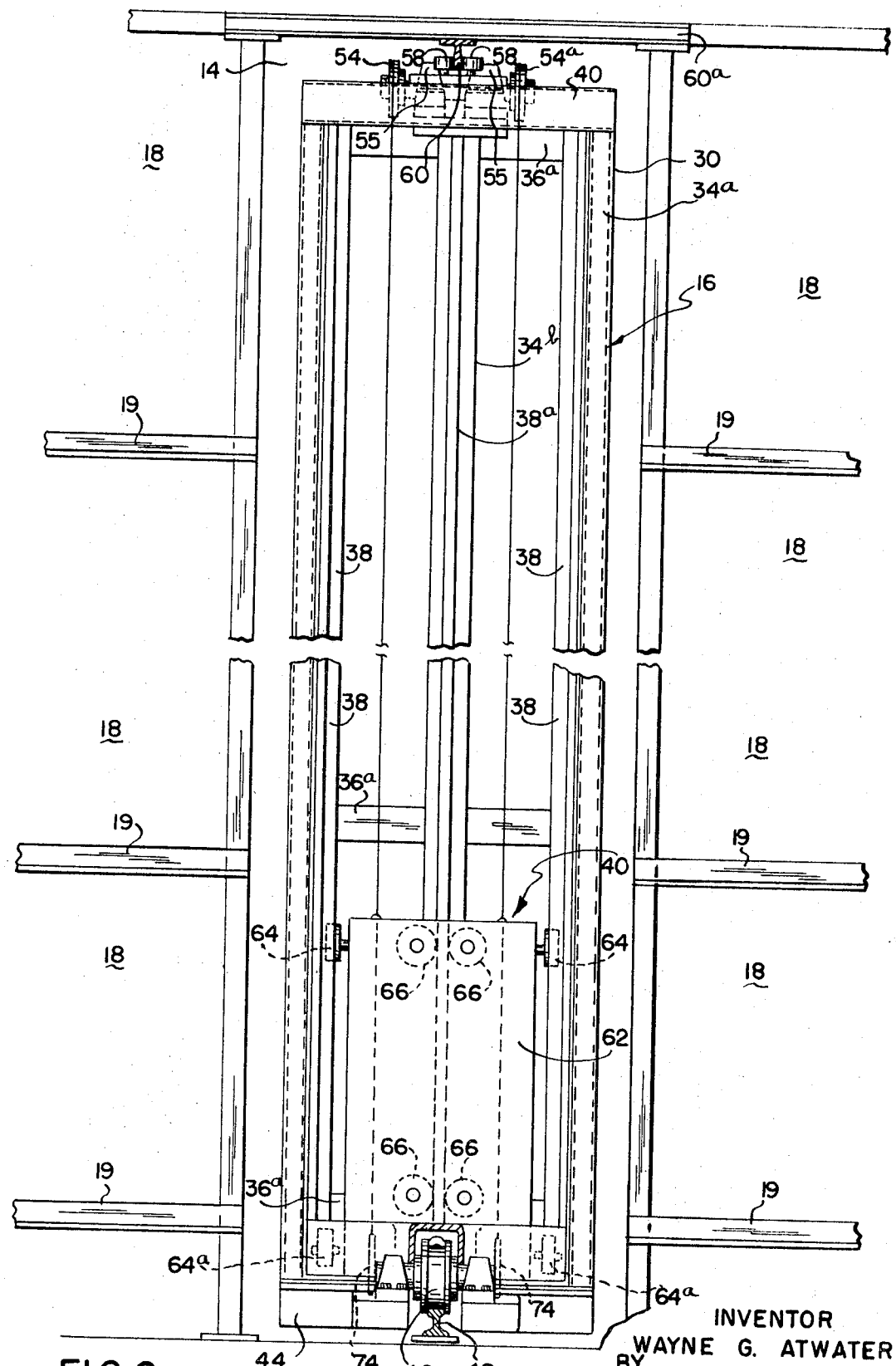
FIG. 2 is an end sectional view of the load carrier mechanism illustrated in FIG. 1 taken generally along the plane of line 2-2 of FIG. 1.

Referring now again to the drawings, and particularly to FIGS. a1 and 4, the warehousing system illustrated comprises a skeletal storage frame or load support means 10, 12 constructed of elongated steel structural members of any suitable cross-sectional shape. Such storage sections are disposed in parallel extending relationship to an aisle or travel zone 14 in which an automatic load carrier mechanism 16 is adapted to move. In the embodiment illustrated a pair of the storage sections are illustrated in confronting relation on opposite sides of aisle 14. The storage frame sections 10 and 12 each define a plurality of vertically and horizontally arranged storage volumes or bins 18 which are adapted to receive loads therein. Each of the bins may be defined by generally laterally spaced support rails 19 with the support rails being adapted to receive the edges of a load bridged thereacross. The storage frame construction may be of general type disclosed in assignee's U.S. Pat. No. 3,371,804 issued Mar. 5, 1968 in the name of Anthony R. Chasar and entitled "AUTOMATIC WAREHOUSING SYSTEM." and reference may be had thereto for a more detailed discussion of the structural details of a warehousing storage frame.

Disposed at one end of each storage bay section 10 and 12 there is provided a pickup and discharge station 20, 22 (FIGS. 4,5) each of which is adapted for receiving a load to be handled by the load carrier mechanism 16 and prior to movement of the load into the travel zone by the load carrier. Such pickup and discharge stations are also adapted to receive a load from the load carrier after such load has been removed from a selected storage bin by the load carrier and returned to the desired pickup and discharge station. Each such pickup and discharge station (which hereafter will be referred to as a P and D station) in the embodiment illustrated comprises a framelike structure including vertical load support members 24 which are spaced from one another as illustrated and which may be connected to one another adjacent their lower ends by crossmembers 26. The upper ends of the vertical support members 24 may include load support plates 28, 28a which likewise are spaced from one another in lateral directions. Loads $L_1$ and $L_2$ may be supported on load supports 28, 28a, and as illustrated. The load support members 28a in accordance with the invention project laterally inwardly toward the associated travel zone 14, which enables a third load $L_3$ to be supported at the pickup and discharge station structure rather than just the two oppositely disposed lateral loads $L_1$ and $L_2$. The spacing X between the inner vertical load supports 24 of spaced P and D stations 20 and 22 is of a predetermined amount, as well as the spacing Y between the inner ends of fork support plates 28, for a purpose to be hereinafter described.

Figure 3:
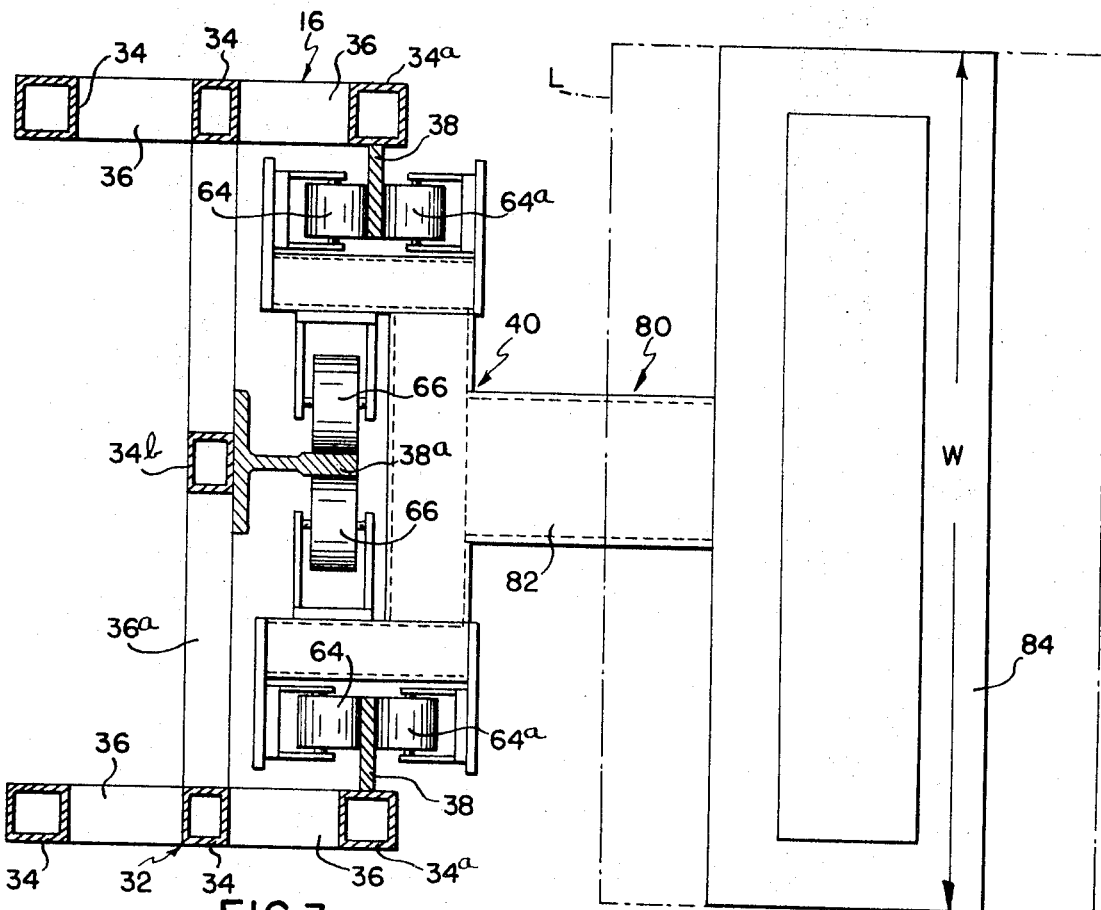
FIG. 3 is a diagrammatic sectional view taken generally along the plane of line 3-3 of FIG. 1, and illustrating the cantilever arrangement of support for the extractor.

The load carrier mechanism 16 may comprise a horizontally movable conveyor portion 30 (FIGS. 1 and 3) including generally upright mast structure 32 formed by vertical columns 34, 34a, 34b. The columns may be connected together by cross struts 36 and crossmembers 36a, providing a generally rigid column structure. Referring now in particularly to FIG. 3, the rearward columns 34a may include vertically extending flanges or tracks 38 while the central column 34b may also include a vertically extending track 38a, which tracks guide the vertical movement of the elevator portion 40 of the load carrier unit. The mast structure and reinforcing strut structure extend between the upper and lower sections 42, 44 of the conveyor portion of the load carrier, and are secured thereto in generally rigid relation.

The lower load carrier section 44 may comprise a generally step-shaped (in side elevation) carriage frame (FIG. 1) supported on flanged wheels 46 which in turn ride on a rail member 48 extending lengthwise of the travel zone, and mounted, in the embodiment illustrated, on the floor of the storage area. As can be seen, the carriage 44 is of considerable length, and thus the load carrier mechanism is quite stable as it moves along the respective travel zone.

Carriage section 44 may be driven as by means of a preferably reversible electric motor 50 mounted on the carriage and operably coupled as by means of drive mechanism 52 to one of the wheels of the carriage, for driving the load carrier mechanism horizontally along the center rail 48.

The aforementioned upper section 42 of the conveyor portion of the load carrier may include a generally rectangular frame-supporting sprockets 54 mounted on a common shaft 54a rotatably mounted on frame section 42 as by means of bearings 55. Due to the rigidity of the load carrier conveyor portion including the mast structure and reinforcing components, the load carrier conveyor portion is maintained in good alignment with the vertical posts of the storage frame, as the load carrier moves along the aisle to deposit loads into or retrieve loads from the selected storage bin.

Upper frame section 42 preferably has laterally spaced rollers 58 rotatably mounted thereon, which rollers coact in rolling engagement with a rail member 60 running lengthwise of the aisle or travel zone of the warehousing system. Rail 60 may be supported on the storage frame structure by cross structure 60a thereof. Such rollers coacting with the rail 60 guide the upper end of the load carrier structure in its horizontal movement along the respective aisle.

The aforementioned elevator portion 40 is preferably of fabricated construction and comprises a body portion 62 having vertically spaced sets of rollers 64, 64a rotatably mounted thereon, adapted for rolling coaction with opposite sides of tracks 38, and rollers 66 rotatably mounted thereon for rolling coaction with vertical track 38a. Such rollers guide the vertical movement of the elevator portion 40 with respect to the conveyor portion of the load carrier.

A preferably reversible, electric motor 67 may be mounted on the conveyor portion 30 and may be coupled by suitable gear reduction mechanism 67a (FIG. 1) to lateral sprockets 68, which in turn coact with chains 70, which are anchored as at 71 to the elevator portion, for moving the elevator portion vertically with respect to the conveyor portion. Chains 70 which may be endless, extend about sprockets 72 and 74 (FIG. 1) and aforementioned sprockets 54. Energization of motor 67 causes sprockets 68 to rotate, thus moving the chains and thus moving the elevator portion vertically with respect to the conveyor portion of the load carrier mechanism. Positioning of the vertical hoisting motor 67 adjacent the lower end of the load carrier mechanism makes accessibility to the motor much more expeditious and thus simplifies maintenance on the load carrier mechanism.

Projecting outwardly from the body portion 62 of the elevator portion is a cantilevered support section 80 which comprises a relatively narrow neck 82 and a relatively larger head 84, the latter being adapted to mount an extensible extractor mechanism 86. Extractor mechanism 86 is adapted to move laterally of the elevator portion with a load supported thereon and deposit the load in a selected storage bin of the storage frame or to move laterally of the elevator and pick up a load that is already in the storage frame and move it back to the desired pickup and discharge station. Such extractor mechanism preferably provides an extensible table with the table being extendible in either of the opposed directions transverse to the direction of movement of the load carrier in the travel zone, so as to locate the extractor within either of the storage sections associated with the travel zone, effective to place the extendible table in position to deposit a load into or remove a load from a selected storage bin in a selected storage section, and likewise to extend into the respective pickup and discharge station 20 or 22 and either deposit a load thereon or remove a load therefrom. Suitable power means, such as a reversible electric motor 87 (FIG. 1) may be operably connected to the extractor for actuating the latter. Reference may be had to U.S. Pat. No. 3,432,056 entitled LATERALLY MOVABLE EXTRACTOR MECHANISM, issued Mar. 11, 1969 for a more detailed disclosure of a suitable extractor mechanism.

When depositing a load in one of the storage bins of the storage frame, the head section 84 of the elevator portion 40 and associated extractor mechanism 86 may be located opposite the selected storage bin such that as the load is moved into the selected bin, the upper surface of the extractor is slightly above the horizontal flanges of the load-supporting rails 19 mounted on the sides of and defining the bottom extremity of the respective bin. When the load is completely within the confines of the bin, the elevator may be lowered slightly thereby moving the extended extractor downwardly between the rails of the respective bin, to deposit the load in bridging relation onto the rails, and permit retraction of the extractor back to its generally centered position with respect to the elevator and with respect to the head section 84 of the elevator.

Conversely, when it is desired to move a load from a bin or load support means, the extractor on the elevator is located such that the top surface of the extractor is extended into the bin (or into the respective pickup and discharge station) slightly below the load. Thereafter, the elevator may be raised so as to lift the load off its supporting load support structure, and then the extractor is retracted back to its centered position preparatory to moving the load carrier to its next position in the warehousing system.

Figure 4:
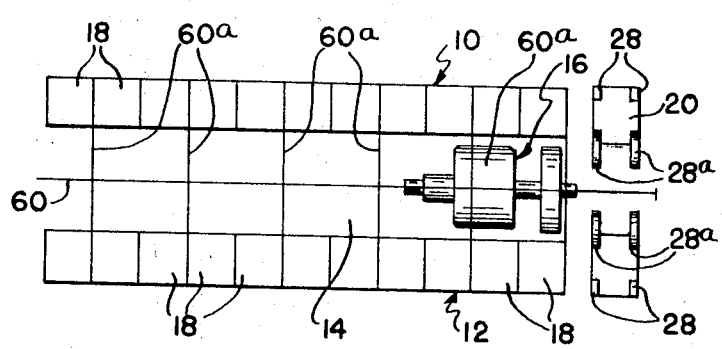
FIG. 4 is a diagrammatic top plan view of a fork-type pickup and discharge station assembly which provides three positions for accumulating loads instead of the usual two positions.
Figure 5:
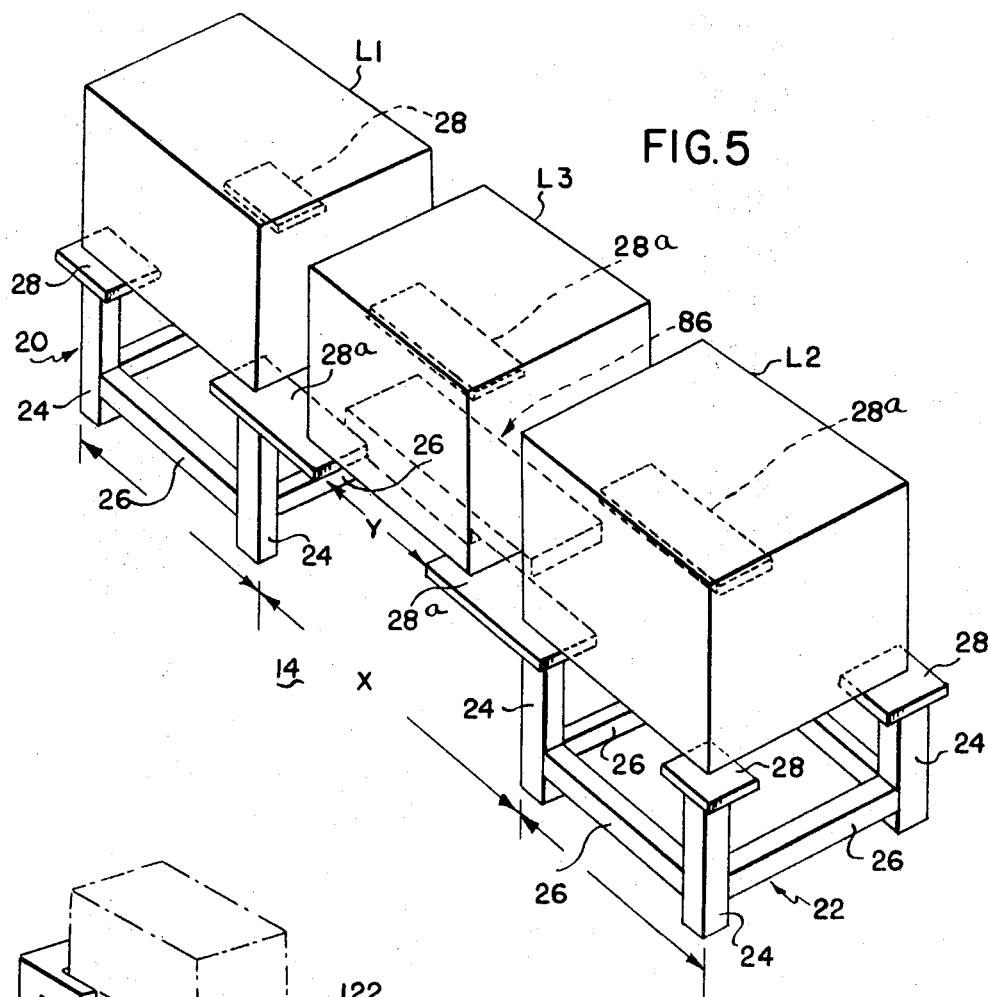
FIG. 5 is a diagrammatic generally perspective illustration of the fork-type P and D station mechanism of FIG. 4 and showing the three loads in position on the station assembly.
Figure 12:
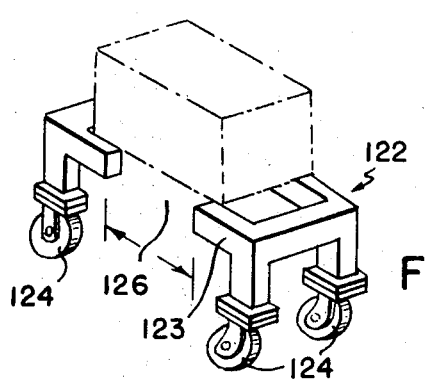
FIG. 12 is a diagrammatic generally perspective view of the mobile P and D cart station of the FIG. 11 embodiment showing a load supported thereon in position for presentation to the load carrier.

Referring now to FIGS. 4 and 5, it will be seen that with the triple load arrangement of P and D station illustrated, the extractor mechanism 86 can be first located beneath the intermediate load $L_3$, with the extractor and the head support section 84 of the elevator being positioned horizontally between the inner vertical posts 24 of the P and D stations 20 and 22, and beneath the support fork plates 28a. Thereafter, the elevator portion is merely raised vertically to above the support plates 28a, to lift the load off the support blades, and then the load carrier is moved lengthwise of the travel zone by energization of motor 50, to move the load away from the P and D station area. Thereafter, the loads on the P and D stations 20, 22 proper can be handled by the load carrier and by extending the extractor beneath the loads $L_1$ or $L_2$ and intermediate the vertical support posts 24 of the respective P and D station and raising the load off its respective load support structure. It will be noted that the inner vertical legs 24 of the station 20, 22 in the embodiment illustrated must be disposed substantially outside the vertical side planes of the aisle, so that when the load carrier is handling a load at the central load position $L_3$, the head 84 of the support portion 80 and the supported extractor 86 of the load carrier can clear such vertical inner legs 24 without interference occuring therebetween. In this connection dimension Y (FIG. 5) is greater than the width of neck 82 and dimension X is greater than the transverse width W (FIG. 3) of the head 84 and supported extractor 86.

Figure 6:
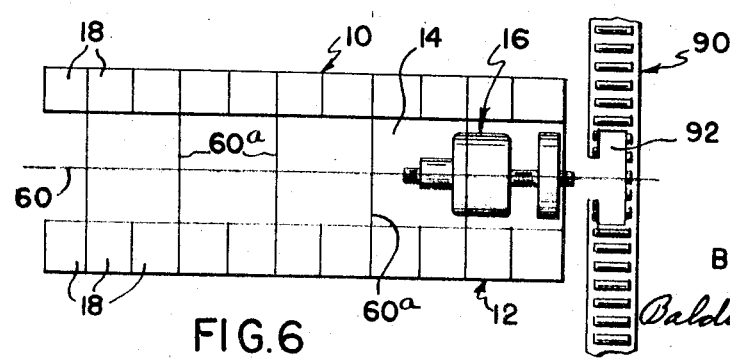
FIG. 6 is a diagrammatic top plan illustration of a warehousing system embodying load carrier mechanism of the invention, and illustrating conveyor feed of loads into and from the system with a recess or cutout being formed in the conveyor adapted to receive in nesting relation the cantilever-mounted extractor mechanism of the load carrier during handling of a load at the conveyor.

Referring now to FIG. 6, there is illustrated a warehousing system which in the embodiment illustrated, is of a single-aisle type with an input-output conveyor 90 coacting with the load carrier 16 for moving loads into accessible position with respect to the load carrier, and for moving loads away from the load carrier after such loads have been brought out of storage by the load carrier. Such a conveyor mechanism 90 may comprise a roller-type conveyor which may be of the power-driven type or of the gravity feed type, for moving a load in a direction toward and away from the travel zone or aisle in the warehousing system.

The conveyor 90 has a cutout portion 92 formed therein as illustrated for instance in FIGS. 6 and 7, with such cutout portion 92 being slightly larger in dimension, in plan, than the dimensions of the cantilevered support section 80 and supported extractor 86 of the load carrier. Thus, the cantilevered section 80 and supported extractor 86 can be lowered into nested relationship in the conveyor cutout portion 92 to deposit a load on the conveyor, or can be positioned by movement of the load carrier below the conveyor and raised upwardly through cutout portion 92 to lift the load from the conveyor. Suitable stops 94 (FIG. 7) which may be of the extensible and retractable type may be provided for positioning a load in proper position with respect to cutout portion 92 in the conveyor, for subsequent handling by the load carrier. Preferably the conveyor includes the segmental roller units 96 (FIG. 7) which facilitate the moving and supporting of a load in proper position with respect to cutout portion 92.

Referring now to FIG. 8, there is shown another embodiment of single aisle warehousing system utilizing an input-output conveyor 90' for coaction with the load carrier of the system, for moving loads into and out of the storage bins, and wherein the conveyor 90' is similar to that of the conveyor 90 aforedescribed, including the cutout portion 92' therein. However, in this conveyor arrangement, both ends are indented or slotted as at 100, 100a for coaction with lift trucks or the like having conventional fork-type lifts for lifting the loads onto the conveyor such as for instance, at end 100, and lifting the loads off the conveyor as for instance at end 100a.

FIG. 9 illustrates a warehousing system wherein an input-output conveyor 102 coacts with a plural aisle warehousing rack system, and with said conveyor having a plurality of cutout sections 104, 106 and 108 therein, of a construction generally similar to that aforedescribed in connection with FIGS. 7 and 8, for coaction with an associated load carrier mechanism 16 in the operation of handling loads in the respective aisle. In other respects, this system may be generally similar to that aforedescribed in connection with FIGS. 6 through 8.

FIG. 10 shows a further embodiment of warehousing system wherein a rotary P and D station assembly is provided at one end of the aisle. The P and D stations 110 through 116 on rotary platform 118 may have raised load supports 120 for supporting a load thereon, and generally similar to the load supports of FIG. 5 which support loads $L_1$ and $L_2$ thereon. The cantilever section 80 of the load carrier is adapted to be received intermediate the load supports of the respective P and D station, and to either deposit a load thereon or remove a load therefrom, by moving vertically relative to and intermediate such load supports. After a load is handled by the load carrier at P and D station 112, the platform 118 is rotated whereby a new station is made active and disposed in aligned relationship with the aisle, and in position for coaction with the load carrier. Meanwhile, loads can be removed from or placed at the other P and D stations, either by lift trucks or some other mechanism that can coact with the load supports 120 at the station locations. Such an arrangement can be used in plural aisle warehousing system due to the compact nature of the rotary station mechanism.

Figure 11:
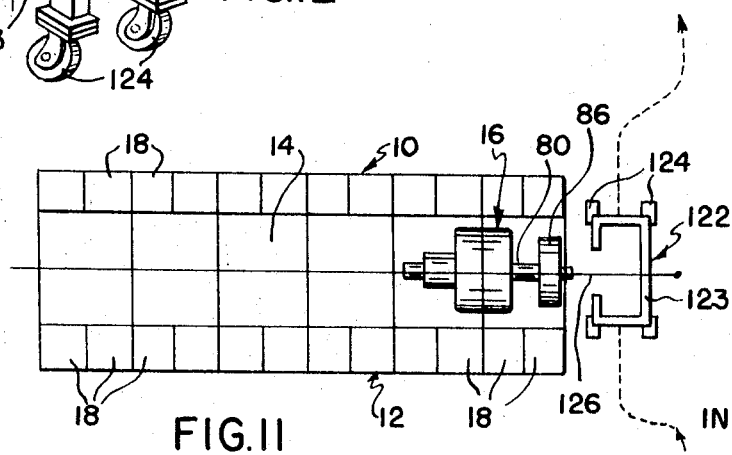
FIG. 11 is a top plan diagrammatic illustration of a further warehousing system utilizing the movable cart-type P and D station which can be moved into position for coaction with a load carrier.

FIG. 11 shows a further embodiment of automatic warehousing system wherein the P and D station comprises a mobile pickup and discharge unit 122 which includes a framework 123 supported in the embodiment illustrated on wheels 124. The framework is cut away as at 126 for vertical passage therethrough of the neck 82 of the cantilevered support portion 80 of the load carrier, so that the support portion 80 of the load carrier can move beneath the load and lift it from the station, or can move above the station and move downwardly to deposit a load at the station. Thus the station can be made mobile with a load thereon, and moved into position for coaction with the load carrier, and the load can be handled by the load carrier and placed in storage, and a load may be brought out of storage and placed back on the empty P and D station, after which the P and D station may be moved by some suitable means such as a tractor or the like, away from the storage area.

From the foregoing discussion and accompanying drawings it will be seen that the invention provides an automatic warehousing system which includes a novel arrangement of load carrier mechanism which is adapted to be disposed in nesting or intermediate relationship with an associated pickup and discharge station of the system and especially in a cutout portion of a P and D station, such as for instance as located on an input-output conveyor mechanism, for expeditiously handling loads moving into and out of the warehousing system.

The terms and expressions which have been used are used as terms of description and not of limitation and there is no intention in the use of such terms and expressions of excluding any equivalents of any of the features shown or described or portions thereof, and it is recognized that various modifications are possible within the scope of the terms and expressions utilized to define the invention.

What I claim is:

1. In an automatic warehousing system comprising a plurality of horizontally and vertically disposed load support means having open load-receiving ends defining a generally vertical plane and there being an elongated travel zone alongside of said plane, a load carrier movable in said travel zone for delivering loads to said load support means and retrieving loads from said load support means, power means for actuating said load carrier, and control means for said power means, the combination therewith of other load support means disposed transversely across at least a portion of said travel zone for supporting a load thereon in position to be transferred by said load carrier from said other load support means to a selected one of the first-mentioned support means and vice versa, said load carrier comprising a generally horizontally movable conveyor portion, an elevator portion mounted for vertical movement on said conveyor portion, and an extensible extractor portion on said elevator portion mounted for lateral movement transversely relative to said travel zone, said elevator portion including a cantilever section on which said extractor portion is mounted, said other support means including means providing for nesting relation of said cantilever section and mounted extractor portion with said other support means during handling of a load by said load carrier at said other support means, whereby said cantilever section and mounted extractor portion may move generally vertically through said other support means during said nesting relation.

2. A warehousing system in accordance with claim 1 wherein said other load support means comprises a conveyor, said conveyor having a cutout section forming said nesting relation means therein, and into which said cantilever section and said extractor portion of said load carrier is adapted to move during handling of a load by said load carrier to and from said other load support means.

3. A warehousing system in accordance with claim 1 wherein said elevator portion comprises a body section having means thereon adapted for rolling coaction with said conveyor portion during vertical movement of said elevator portion with respect to said conveyor portion, a neck section projecting outwardly from said body section and a head section extending transversely of said neck section, said head section supporting said extractor portion thereon, said extractor portion comprising an extensible table adapted for lateral extending movement with respect to said head section, and said head and neck sections comprising said cantilever section of said elevator.

4. A warehousing system in accordance with claim 1 including means for moving said elevator portion vertically with respect to said conveyor portion, said means comprising a motor means mounted adjacent the lower end of said conveyor portion, said motor means comprising a portion of said power means, and flexible support means movably mounted on said conveyor portion and being attached to said elevator portion, said flexible means coacting with said motor means whereby energization of said motor means causes movement of said flexible means to cause vertical movement of said elevator portion in the direction of energization of said motor means.

5. A warehousing system in accordance with claim 4 wherein said means for moving said elevator vertically includes circular members rotatably mounted on said conveyor portion adjacent the upper and lower ends thereof, and a rotatable drive member operably coupled to said motor means and coacting with said flexible means for moving said flexible means upon energization of said motor means.

6. A warehousing system in accordance with claim 4 wherein said conveyor portion comprises a lower carriage section and an upper section connected by vertically extending mast structure, track means in said travel zone supporting said carriage section thereon for movement of said conveyor portion in said travel zone, said elevator portion being mounted for vertical movement on said mast structure, said motor means being mounted on said carriage section and operably coupled to said flexible means.

7. A warehousing system in accordance with claim 4 wherein said conveyor portion comprises an upstanding mast structure supported at its lower end on a mobile carriage, said mast structure including vertically extending rail means thereon, and roller means on said elevator portion adapted for rolling coaction with said rail means on opposite sides of the latter for guiding the vertical movement of said elevator portion with respect to said mast structure of said conveyor portion, said motor means being mounted on said carriage, and sprocket means rotatably mounted on said conveyor portion and coacting with said flexible means for supporting the latter on said conveyor means.

8. A warehousing system in accordance with claim 1 wherein said other load support means comprises spaced pickup and discharge station frames disposed on opposite sides of said travel zone and including vertical load support members adapted to support a load thereon, said vertical members of each pickup and discharge station frame being spaced laterally with respect to one another a predetermined amount for receiving therebetween said extractor portion of said load carrier for handling a load at the respective station, said extractor portion being laterally extendible in both directions generally transverse to the direction of extension of said travel zone, said pickup and discharge station frames having inwardly extending load-supporting means thereon adapted to receive a load in bridging relation between the frames of said stations, thereby providing for the support of at least three loads on said pickup and discharge station frames.

9. A warehousing system in accordance with claim 8 wherein the distance between the innermost vertical support members of the confronting pickup and discharge station frames is substantially as great as the width of said travel zone whereby said extractor portion can be moved between said innermost vertical support members and into underlying relationship with respect to a bridging load.

10. A warehousing system in accordance with claim 3 wherein said other load support means comprises a conveyor extending past said travel zone generally perpendicular to the lengthwise direction of said travel zone, said conveyor having a cutout portion therein adapted to receive in nesting relation said neck and head sections of said elevator portion, said cutout portion being disposed in alignment with said travel zone whereby when a load is positioned at said cutout portion, said load carrier can handle the load.

11. A warehousing system in accordance with claim 10 wherein said conveyor includes means at least one end thereof adapted to receive in coacting relationship tines of a conventional forklift truck for placing loads onto or removing loads from said conveyor.

12. A warehousing system in accordance with claim 10 wherein said conveyor includes a plurality of spaced cutout portions disposed therein, and said system includes a plurality of travel zones having load support storage means disposed along each of said travel zones with each of said cutout portions being disposed in coacting generally aligned relationship with a respective one of said travel zones.

13. A warehousing system in accordance with claim 10 wherein said other load support means comprises a plurality of vertically spaced conveyors, each of which has at least one cutout portion therein disposed in alignment with the travel zone.

14. A warehousing system in accordance with claim 3 wherein said other load support means comprises a rotatable platform located at one end of said travel zone in alignment therewith, said platform having load supports thereon defining spaced pickup and discharge stations, said platform being adapted for rotation to present a selected one of said stations into alignment with said travel zone for positioning a load on said selected one of said stations for handling by said load carrier.

15. A warehousing system in accordance with claim 10 including means coacting with said cutout portion for locating a load at said cutout portion for subsequent handling by said load carrier.